Dec. 23, 1930.    J. W. SANFORD    1,785,980
AUTOMATIC COMPRESSOR CONTROL SYSTEM
Original Filed Nov. 16, 1927    2 Sheets-Sheet 1

Inventor:
John W. Sanford.
by
atty.

Dec. 23, 1930.

J. W. SANFORD

1,785,980

AUTOMATIC COMPRESSOR CONTROL SYSTEM

Original Filed Nov. 16, 1927    2 Sheets-Sheet 2

Inventor:
John W. Sanford.
by
atty.

Patented Dec. 23, 1930

1,785,980

UNITED STATES PATENT OFFICE

JOHN W. SANFORD, OF CLAREMONT, NEW HAMPSHIRE, ASSIGNOR TO SULLIVAN MACHINERY COMPANY, A CORPORATION OF MASSACHUSETTS

AUTOMATIC COMPRESSOR-CONTROL SYSTEM

Application filed November 16, 1927, Serial No. 233,695. Renewed March 12, 1930.

This invention relates to automatic compressor control systems and particularly to means for automatically controlling the entire operation of a synchronous motor driven compressor.

There are a number of characteristics of a synchronous motor which makes it very desirable for use in driving air and gas compressors. The advantages of its constant speed with variable load, its high efficiency, and its non-inductive load on the power supply with accompanying reduction in power rates, make it especially adaptable to this field. The comparatively low torque of this motor at starting and until the machine is synchronized on the line makes it desirable that the compressor be completely unloaded during this interval. It is therefore one of the principal objects of my invention to provide an improved means for allowing the motor to start up free of any load whatever, and for insuring that the compressor will remain in a completely unloaded state until it has come up to speed. It is a further object of my invention to provide electrically operated unloading means for the compressor and a magnetic clutch for connecting the motor and compressor, both of which are adapted to be controlled by a circuit connected in parallel with the motor field.

It often happens that the demand for compressed air or gas is very low over a considerable period of time. A typical example of this would be found in the case of a mine using compressed air driven tools where practically no air is needed during the intervals between shifts, or in an extensive mine where a "booster" compressor is often installed, the capacity of which is needed only in periods of greatest demand for air and at all other times may be shut down. In accordance with my invention, I utilize equipment which will load and unload the compressor so as to maintain the desired air pressure during normal operation, stop the machine by disconnecting the motor from the line after the compressor has run continuously unloaded for a definite length of time; maintain the compressor unloaded during the time the motor is not running; start the motor when the air pressure in the receiver drops to the desired minimum; connect the unloaded compressor to the motor when the latter has come up to speed; and then load the compressor at the proper time. This invention also contemplates the provision of a magnetic clutch between the compressor and its driving motor. This magnetic clutch is controlled by a circuit in parallel with the motor field so that the devices which control synchronizing of the motor also control the operation of the magnetic clutch. My invention also includes in combination with this magnetic clutch, electrical means for operating the unloading system which permits the compressor to be loaded only after a certain time has elapsed after the application of the magnetic clutch. Other phases and objects of my invention will hereinafter more fully appear.

In the accompanying drawings I have shown for purposes of illustration one form which my invention may assume in practice.

Figure 1:
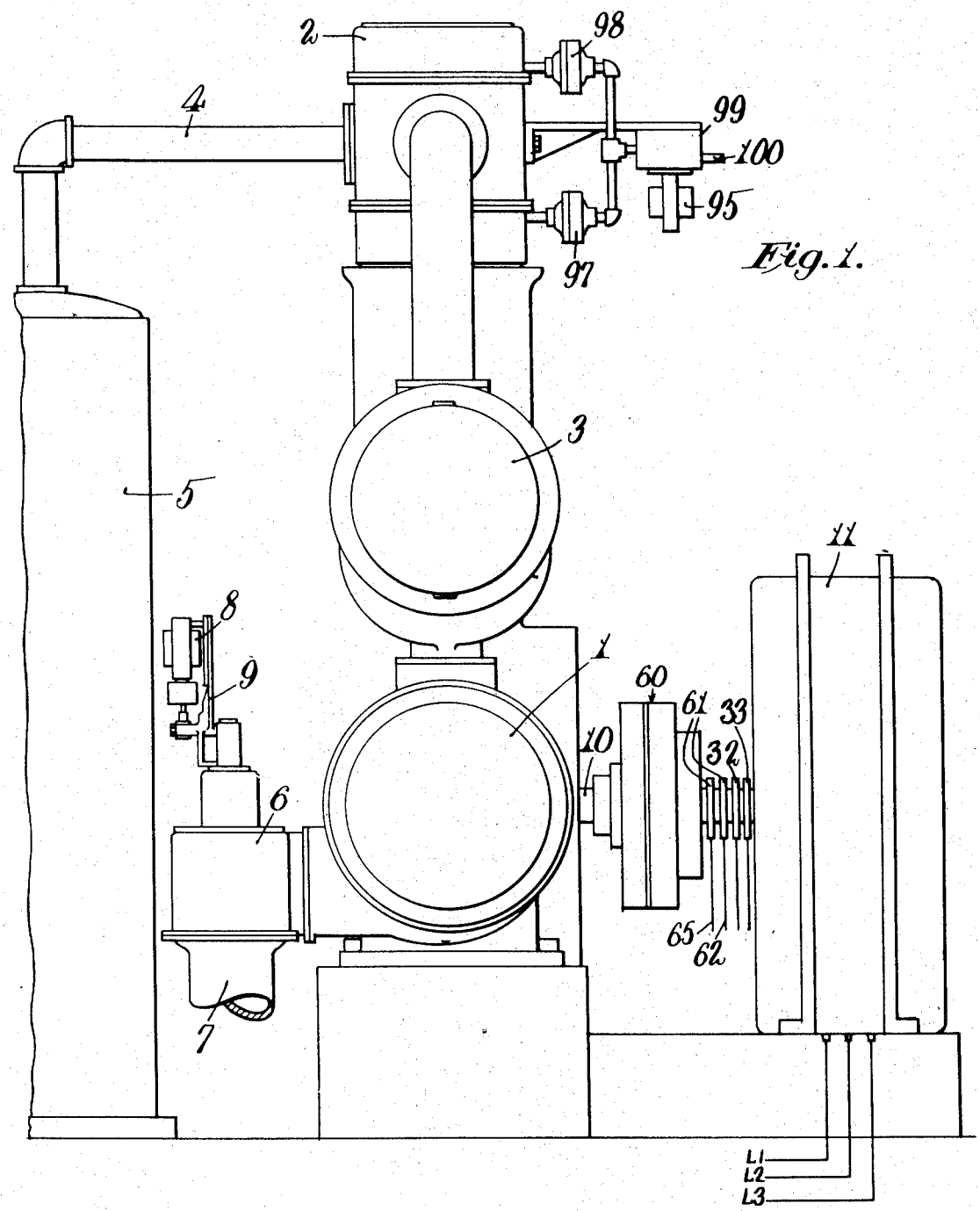
Fig. 1 is a front elevation of an angle compound compressor and its driving motor to which my invention may be applied.
Figure 2:
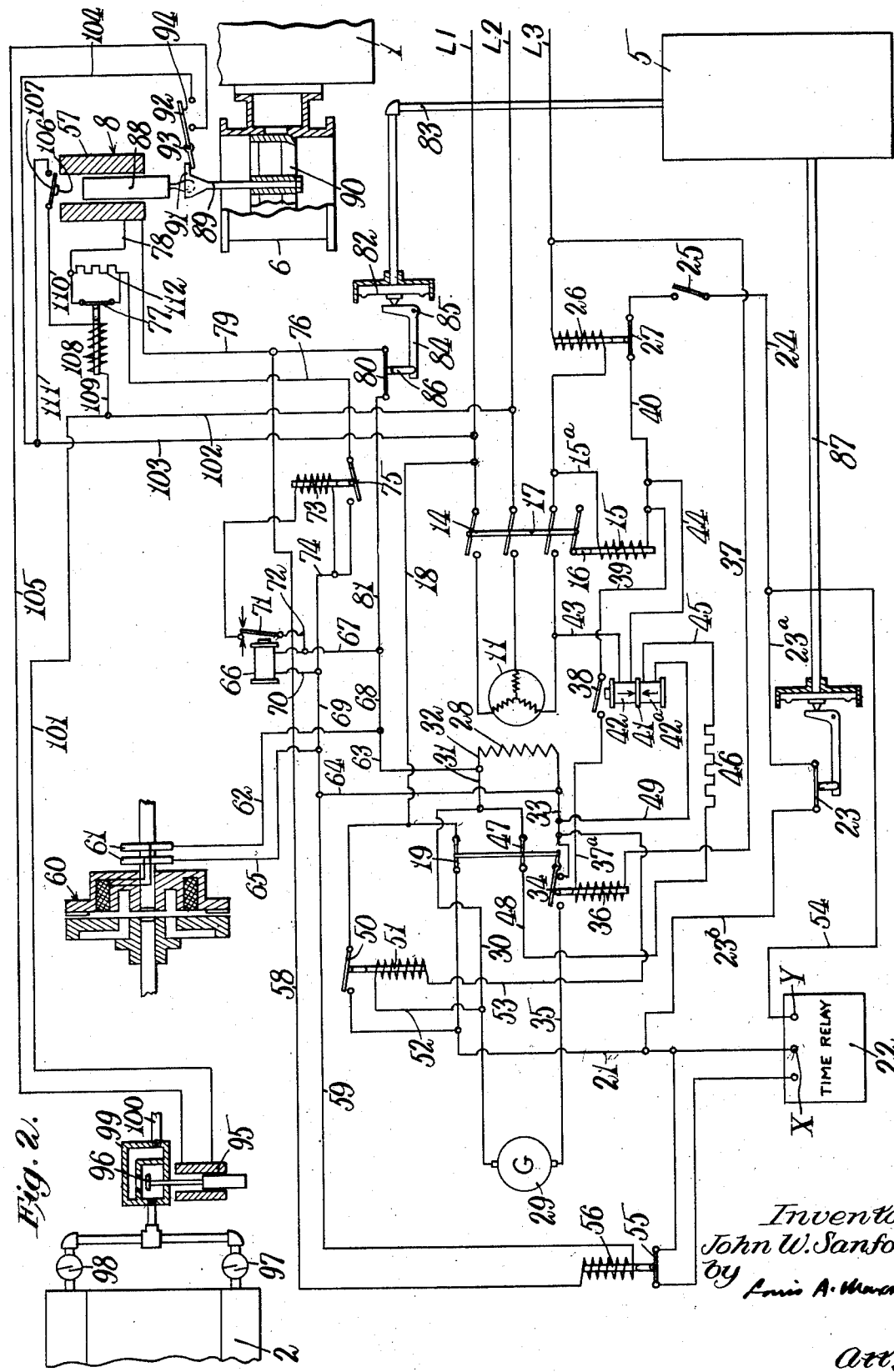
Fig. 2 is a wiring diagram of the complete equipment which I employ for carrying out the objects of my invention.

In Fig. 1 I have shown an angle compound compressor having a low pressure cylinder 1, a high pressure cylinder 2 and an intercooler 3. The compressed air or gas discharges by way of a pipe 4 into a receiver tank 5. A valve 6 is mounted on the low pressure cylinder to control the inlet of air or gas through a pipe 7 to effect loading and unloading of the low pressure cylinder. This valve is automatically operated by a solenoid 8 mounted by means of a bracket 9 on the valve casing. The compressor is driven through a shaft 10 by means of a motor 11, herein of the alternating current synchronous type. Direct current is supplied to the revolving field coils of this motor by means of an exciting set 29 (not shown in Fig. 1) through the collector rings 32 and 33. The main power supply to the motor is carried by the three lines designated L—1, L—2 and L—3, and controlled by switch 14. This switch is automatically opened and closed by means of a solenoid 15 operating through an arm 16 and a bar 17 which carries the main line contactors. Current for operating the control system is supplied from L—1 of the main line through a wire 18, a switch 19, line 21, and through a time relay 22 or a pressure switch 23 to the wire 24 in a manner to be more fully described later on. The time relay and pressure switch are connected in parallel across the wires 21 and 24. This control circuit is completed across one phase of the main line by way of the manually operated switch 25 and through the coil of the solenoid 15 back to L—3. An overload relay 26 is interposed in the main line for breaking the control circuit through a switch 27 and shutting down the motor in the event of an excessive load.

The motor field 28 is supplied with direct current from the exciter 29 through a circuit which includes the wires 30, 31, 32, 33, the solenoid operated switch 34, and wire 35. The switch 34 is operated by means of a solenoid 36 and this solenoid is adapted to be energized by a circuit from the main line through wires 37 and 37ª, switch 38, wires 39 and 40, switch 25, wires 24, 21 and 18. The switch 38 is controlled by a differential relay 41 having one coil 42 connected in a circuit which includes the wires 43 and 44, switch 25, wires 24, 21 and 18. The opposed coil 42ª of this differential relay, which tends to prevent the closing of the switch is connected in a closed circuit through wire 45, resistance 46, wire 48, switch 47, wire 32, the motor field 28, wires 33 and 49. The switch 50 is adapted to be automatically opened by the customary weight or spring of a solenoid 51 to break the control circuit in the event that the voltage from the exciting set fails. It will be noted that the coil of solenoid 51 is connected across the generator 29 through the wires 52 and 53.

For the purpose of shutting down the compressor after it has run unloaded for a definite length of time, I have provided the time relay 22 adapted to break the control circuit through the main line contactor holding coil 15. As before noted the pressure switch 23 and the time relay 22 are connected in parallel across the wires 21 and 24 of the control circuit. This time relay may be of any standard type which, while normally closing the circuit between the wires 21 and 54, will break the connection should the compressor run unloaded for a predetermined interval of time, and moreover will automatically reset itself in the event that the compressor does not run unloaded for the definite time for which it is set. This time relay is controlled by an automatic switch 55 which is normally closed when its coil 56 is not energized. It will be noted that this coil 56 is connected across the direct current lines, which lead to the solenoid coil 57 by way of wires 58 and 59. The solenoid coil 57 is controlled by a circuit in parallel with the motor field 28 in a manner which will be later described. The magnetic clutch, which is generally designated 60 is connected directly in parallel with the motor field by way of collector rings 61, wires 62, 63, 64 and 65. The construction of this magnetic clutch is very familiar to those skilled in the art and it is believed that further description is unnecessary, it being understood that any well known type may be used.

For the purpose of allowing the compressor to come up to speed in an unloaded condition after the clutch has been applied, I have provided a retarding relay 66 connected across the lines which lead from the motor field by way of the wires 68, 67, 70 and 69. This retarding relay acts to close a switch 71, which allows current to flow from the wire 67 through the wire 72, switch 71, coil 73 and the wire 74 back to the other side of the circuit leading from the motor field. The current in the coil 73 acts to close the switch 75 which energizes the coil 57 of the solenoid 8 by way of wires 64, 69, 74, switch 75, wire 76, the switch 77, wires 78 and 79, pressure switch 80, wires 81, 68 and 63. The pressure switch 80 comprises a diaphragm 82 subjected to pressure from the receiver tank 5 to which it is connected by means of a pipe 83. A bell crank lever 84 pivoted at 85 is connected to a link 86 which is in turn connected to the switch 80. In the de-energized position of the solenoid 8, the valve 6 is adapted to be closed, thus shutting off the inlet of air to the low pressure cylinder and unloading the compressor.

The construction of the pressure switch 23 may be identical with the one just described and it may be connected to the receiver tank as by a pipe 87. It will be understood that in either case any usual type of pressure operated switch may be substituted for the one shown. Solenoid 8 has a core 88 which is connected to the valve stem 89 of the inlet unloader valve 90. When the motor has been shut down through the operation of the time relay, the pressure will gradually drop when there is again a demand for air until the switch 23 automatically closes and again establishes the control circuit between wires 21 and 24 by way of the wires 23ª and 23ᵇ.

The means for unloading the high pressure cylinder until the motor has reached synchronous speed will now be described. When the solenoid valve of the low pressure cylinder approaches its lower position a stop 91 on the valve stem 89 engages one arm of a lever 92 pivoted at 93. This operates a switch 94 to open a circuit through the solenoid 95, thereby de-energizing the same and allowing the valve 96 to drop by gravity to open position and vent both ends of the high pressure cylinder by way of check valves 97 and 98 and through the valve casing 99 to the atmosphere at 100. The power for operating this solenoid may be derived from any suitable source; and in this instance it is shown connected across one phase of the main line by way of wires 101, 102, 103, 104, switch 94 and the wire 105. When the solenoid valve 57 approaches its upward limit of travel it engages a stop 106 on a switch 107 and closes a circuit through the coil 108 by way of wires 102, 109, coil 108, wire 110, switch 107, and wires 111 and 103. The coil 108 opens the switch 77 and the direct current flowing through the solenoid 57 must also flow through the resistance 112, the purpose being to cut down the current consumption of the solenoid when the compressor is operating normally.

The operation of the apparatus shown in the wiring diagram will now be briefly described, the parts being assumed to be in the positions illustrated. The switch 25 will be closed by hand, thereby establishing a control circuit through the wire 15ª, coil 15, wire 40, switch 27, wire 24 and either through the pressure switch 23 or time relay 22 to the wire 21 and through the switch 19, and wire 18 to the line L—1. The coil 15 will now automatically operate to close the main line contactors 14, which sends current through the motor armature; and the motor is started in any of the common methods of starting synchronous motors. One of the usual methods is to provide a squirrel cage winding on the rotor and start the motor as an induction machine. As soon as the main line contactors are closed a revolving magnetic field will be induced by the armature current and an alternating current will be generated in the motor field coils, which will flow through a closed circuit by way of wires 32, 31, switch 47, wire 48, resistance 46, coil 42a, wires 49 and 33, and field coils 28. This current continues as long as there is relative movement between the field coils and the revolving field induced by the armature current, the frequency of this current gradually diminishing as the rotor approaches synchronous speed. The effect of current in this circuit is to energize the coil 42a and oppose the closing of switch 38. However, when the rotor attains synchronous speed this current automatically dies out, allowing the coil 42 which is energized, after the main line contactors are closed, through the wires 43, 44, 40, 24, 21 and 18 to close the switch 38. Assuming now that the motor has reached synchronous speed, the switch 38 will be closed under the influence of coil 42 and a circuit will be thus established through the coil 36 by way of wires 37, 37a, switch 38. wires 39, 40, 24, 21 and 18. The switch 34 will now be automatically closed and at the same time the switches 19 and 47 opened, since they are connected to the same shaft as the switch 34. The closing of switch 34 connects the motor field directly with the exciter 29 through the wires 35, 33, 32, and 30. The motor is now synchronized on the line and is capable of carrying its full load.

On the closing of the switch 34 a circuit is immediately established through the magnetic clutch 60, which circuit includes the wires 63, 62, 65 and 64. At the same time the retarding relay 66 will be set into action, since its coil is energized from the circuit connected in parallel with the motor field, which includes wires 68, 67, 70 and 69. It will however, be apparent that an interval of time must elapse between the application of the magnetic clutch and the closing of the switch 71, which is of sufficient length to allow the compressor to come up to full speed. At this time the switch 71 is closed and the holding coil 73 for closing the switch 75 is energized, which establishes a circuit through the solenoid coil 57 by way of the wires 74, switch 75, wire 76, switch 77, wires 78 and 79, switch 80 and wire 81. The compressor is now operating at full speed. As soon as the inlet unloader valve is opened the high pressure cylinder relief valve will be closed in a manner which should be obvious from the above description of the same. During the normal operation of the machine loading and unloading of the compressor will be controlled by means of the pressure operated switch 80. When the solenoid core 88 reaches the upper limit of its travel it engages the stop 106 closing switch 107 which in turn energizes the coil 108 and opens the switch 77, whereby the current for the solenoid is forced to pass through the resistance 112. When the pressure switch 80 is opened by high pressure in the receiver tank, the circuit through the holding coil 56 of switch 55 will be automatically opened, allowing the switch 55 to close and start the operation of the time relay 22. The power for this purpose is derived from the A. C. control circuit which includes the wires 18, 21 and 24. In the event that the compressor runs unloaded for the definite length of time for which the time relay is set to open, as when the demand for air is very low, the relay will function to break the circuit between the contacts X and Y, which will automatically interrupt the control circuit between the wires 21 and 24. It will of course be obvious that the pressure switch 23 does not function at this time to allow current to pass between wires 21 and 24 since it would be held open by high pressure in the receiver tank while the compressor was running unloaded. Breaking of the circuit between wires 21 and 24 will also deenergize coil 36, causing opening of the circuit through which the exciter 29 supplies current to the clutch 60; and the compressor, which is already unloaded, will be disconnected from the motor. However, after sufficient air is used from the receiver tank, the pressure will drop to the point where switch 23 will close and again make the control circuit between wires 21 and 24, which will automatically close the main line contactors and start the motor into operation in the manner heretofore described.

As soon as the switch 34 is closed it will be noted that a circuit is established through the coil 51 and this coil is so designed as to hold the switch 50 in closed position, providing the voltage on the exciter 29 is sufficient for proper operation of the motor. The control circuit between the wires 18 and 21 has been interrupted through the opening of switch 19 but has been automatically completed at the same time through the switch 50. The function of this arrangement is to break the control circuit and shut down the motor in the event that the voltage of the exciter fails for any reason.

As a result of my invention it will be apparent that I have provided a very simple arrangement for insuring that the compressor will remain disconnected from the motor until the motor is synchronized, and remain unloaded until after the compressor comes up to speed. I have also provided an arrangement which will shut down the motor in case the compressor runs unloaded for a certain interval of time and which will automatically start the machine up again when the pressure drops, hold the compressor disconnected until the motor attains synchronous speed, then operate the magnetic clutch to connect the motor and compressor, and at a slightly later time load the compressor and operate to maintain the pressure for which the pressure regulating switches are set. The necessary equipment is standard for the most part and its detailed construction need not be illustrated nor described since they are well known by those familiar in the art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an automatic compressor control system, a compressor, a driving motor therefor, clutch means for connecting the motor and compressor, means for automatically controlling the clutch means to connect the compressor and motor only after the latter has reached substantially its normal operating speed, unloading devices for said compressor, and means for maintaining the same in unloading position for a predetermined length of time after the clutch means have been applied.

2. In an automatic compressor control system, a compressor, a driving motor therefor, clutch means for connecting the motor and compressor, means for automatically controlling the clutch means to connect the compressor and motor only after the latter has reached substantially its normal operating speed, unloading devices for said compressor, means for maintaining the same in unloading position for a predetermined length of time after the clutch means have been applied, and means for controlling said unloading devices during normal operation of the compressor to load and unload the compressor in response to variations in the discharge pressure.

3. In an automatic compressor control system, a compressor, a driving motor therefor, clutch means for connecting the motor and compressor, electrical means for automatically controlling the clutch means to connect the compressor and motor only after the latter has reached substantially its normal operating speed, unloading devices for said compressor, electrical operating means therefor, and means including a retarding relay for maintaining said unloading devices in unloading position for a predetermined length of time after the clutch means have been applied.

4. In an automatic compressor control system, a compressor, a driving motor therefor, clutch means for connecting the motor and compressor, means for automatically controlling the clutch means to connect the compressor and motor only after the latter has reached substantially its normal operating speed, unloading devices for said compressor, means for maintaining the same in unloading position for a predetermined length of time after the clutch means have been applied, means for controlling said unloading devices during normal operation of the compressor to load and unload the compressor in response to variations in the discharge pressure, and means for stopping said compressor after the same has run unloaded for a predetermined length of time.

5. In an automatic compressor control system, a compressor, a driving motor therefor, clutch means for connecting the motor and compressor, means for automatically controlling the clutch means to connect the compressor and motor only after the latter has reached substantially its normal operating speed, unloading devices for said compressor, means for maintaining the same in unloading position for a predetermined length of time after the clutch means have been applied, means for controlling said unloading devices during normal operation of the compressor to load and unload the compressor in response to variations in the discharge pressure, means for stopping said compressor after the same has run unloaded for a predetermined length of time, and means for again automatically starting up said compressor when the receiver tank pressure drops below the desired minimum and for loading the compressor at the proper time after it has come up to speed.

6. In combination, a compressor, a synchronous motor for driving the same, clutch means for connecting said motor and compressor, and means for controlling synchronizing said motor adapted also to control the application of said clutch means.

7. In combination, a compressor, a synchronous motor for driving the same, unloading means for said compressor, clutch means for connecting said motor and compressor, and means for controlling synchronizing said motor adapted also to control both said unloading means and the application of said clutch means.

8. In combination, a compressor, a synchronous motor for driving the same, and a magnetic clutch for connecting said motor and compressor, said clutch being connected in a circuit in paralell with the field of said motor so as to be supplied with direct current when the same is supplied to said field.

9. In combination, a compressor, a synchronous motor for driving the same, unloading means for said compressor, a magnetic clutch for connecting said motor and compressor, said clutch being connected in a circuit in parallel with the field of said motor so as to be supplied with direct current when the same is supplied to said field, and electromagnetic means for controlling said unloading means adapted to unload the compressor when there is no current in said circuit.

10. In an automatic compressor control system, a compressor having means for loading and unloading the same, a synchronous motor for driving the same, means for controlling loading and unloading of said compressor in response to variations in receiver tank pressure during normal operation, means for automatically stopping the motor and compressor when the latter has run unloaded continuously for a predetermined length of time, means for automatically starting the motor when the receiver tank pressure drops below the desired minimum, means for synchronizing the motor at the proper time, clutch means controlled by said synchronizing means for connecting the motor and compressor after the motor has been synchronized, and means permitting the compressor to be loaded only after application of said clutch means.

11. In an automatic compressor control system, means for controlling loading and unloading of the compressor in response to variations in compressor discharge pressure during normal operation, means for automatically stopping the motor and compressor when the latter has run unloaded continuously for a predetermined length of time, means for automatically starting the motor when the receiver tank pressure drops below the desired minimum, means for synchronizing the motor at the proper time, and clutch means controlled by said synchronizing means for connecting the motor and compressor after the motor has been synchronized.

12. In combination, a compressor, a synchronous motor for driving the same, unloading means for said compressor, a magnetic clutch for connecting said motor and compressor, said clutch being connected in a circuit in parallel with the field of said motor so as to be supplied with direct current when the same is supplied to said field, electro-magnetic means for controlling said unloading means adapted to unload the compressor when there is no current in said circuit, and means responsive to compressor discharge pressure for controlling the supply of current to said electromagnetic means whereby to load and unload the compressor during normal operation in response to variations in compressor discharge pressure.

13. In an automatic compressor control system, means for controlling loading and unloading of the compressor in response to variations in compressor discharge pressure during normal operation, an electrically actuated switch for controlling the main current supply to the driving motor, electrical means for opening said switch when said compressor has run unloaded for a predetermined length of time, other electrical means associated therewith for closing said switch to start the motor independently of said time responsive means when pressure in the receiver tank drops below a predetermined minimum, means for synchronizing the motor at the proper time, and clutch means controlled by said synchronizing means for connecting the motor and compressor after the motor has been synchronized.

14. In combination, a compressor, an electric driving motor therefor, a switch for controlling said motor, a magnetic clutch for connecting said motor and compressor, unloading means for said compressor, means responsive to compressor discharge pressure for controlling said unloading means, means for interrupting operation of said compressor after the same has run unloaded for a predetermined length of time, and means for again automatically starting operation of said compressor when compressor discharge pressure drops below a predetermined minimum including means for effecting energization of said magnetic clutch.

15. In combination, a compressor, an electric driving motor therefor, a switch for controlling said motor, a magnetic clutch for connecting said motor and compressor, unloading means for said compressor, means responsive to compressor discharge pressure for controlling said unloading means, means for interrupting operation of said compressor after the same has run unloaded for a predetermined length of time, means for again automatically starting operation of said compressor when compressor discharge pressure drops below a predetermined minimum including means for effecting energization of said magnetic clutch, and means for maintaining said unloading means in unloading position until said compressor reaches its normal operating speed.

16. In combination, a compressor, an electric driving motor therefor, a switch for controlling said motor, a magnetic clutch for connecting said motor and compressor, unloading means for said compressor, means responsive to compressor discharge pressure for controlling said unloading means, a time relay for interrupting operation of said compressor after the same has run unloaded for a predetermined length of time, and means for again automatically starting operation of said compressor when compressor discharge pressure drops below a predetermined minimum including means for effecting energization of said magnetic clutch.

17. In combination, a compressor, an electric driving motor therefor, a switch for controlling said motor, a magnetic clutch for connecting said motor and compressor, unloading means for the compressor, means responsive to compressor discharge pressure for controlling said unloading means, means for interrupting operation of said compressor after the same has run unloaded for a predetermined time, and means for again automatically causing said compressor to operate loaded when compressor discharge pressure drops below a predetermined minimum including means for starting the motor, actuating the clutch and loading the compressor in the sequence stated.

In testimony whereof I affix my signature.
JOHN W. SANFORD.